(12) United States Patent
Yang et al.

(10) Patent No.: US 8,624,861 B2
(45) Date of Patent: Jan. 7, 2014

(54) METHOD FOR DETERMINING TOUCH POINT

(75) Inventors: Chun-Wei Yang, Hsin-Chu (TW);
Chun-Lung Hung, Hsin-Chu (TW);
Jing-Jhih Huang, Hsin-Chu (TW);
Yu-Min Hsu, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 296 days.

(21) Appl. No.: 13/253,134

(22) Filed: Oct. 5, 2011

(65) Prior Publication Data
US 2012/0242595 A1  Sep. 27, 2012

(30) Foreign Application Priority Data
Mar. 21, 2011  (TW) .............................. 100109606 A

(51) Int. Cl.
*G06F 3/041* (2006.01)
*G09G 5/00* (2006.01)

(52) U.S. Cl.
USPC .......................................... 345/173; 345/156

(58) Field of Classification Search
USPC .................................................. 345/156, 173
See application file for complete search history.

(56) References Cited

U.S. PATENT DOCUMENTS

| 763,011 | A | 6/1904 | Mietaschk |
| 7,088,342 | B2* | 8/2006 | Rekimoto et al. ............ 345/169 |
| 7,784,362 | B2* | 8/2010 | Shimojo .................. 73/862.041 |
| 8,130,212 | B2* | 3/2012 | Umeda .......................... 345/178 |
| 8,135,171 | B2* | 3/2012 | Ho et al. ....................... 382/103 |
| 8,390,587 | B2* | 3/2013 | Fan et al. ...................... 345/173 |
| 2006/0279551 | A1 | 12/2006 | Lii et al. |
| 2007/0268269 | A1* | 11/2007 | Chang et al. .................. 345/173 |
| 2007/0296709 | A1* | 12/2007 | GuangHai ..................... 345/173 |
| 2008/0012838 | A1* | 1/2008 | Rimon .......................... 345/174 |
| 2009/0187375 | A1* | 7/2009 | Kinoshita et al. ............. 702/158 |
| 2009/0255737 | A1* | 10/2009 | Chang et al. ............... 178/18.06 |
| 2010/0053116 | A1* | 3/2010 | Daverman et al. ............ 345/175 |
| 2010/0079397 | A1* | 4/2010 | Yang et al. .................... 345/173 |
| 2010/0134442 | A1* | 6/2010 | Yang et al. .................... 345/175 |
| 2010/0200310 | A1* | 8/2010 | Yeh et al. ................... 178/18.03 |
| 2010/0321313 | A1* | 12/2010 | Oda et al. ...................... 345/173 |
| 2011/0037720 | A1* | 2/2011 | Hirukawa et al. ............. 345/173 |
| 2011/0063249 | A1 | 3/2011 | Chou et al. |
| 2011/0221695 | A1* | 9/2011 | Wu ................................ 345/173 |
| 2011/0302519 | A1* | 12/2011 | Fleizach et al. ............... 715/773 |
| 2012/0206399 | A1* | 8/2012 | Wang et al. ................... 345/174 |
| 2012/0262419 | A1* | 10/2012 | Hershman et al. ............ 345/174 |

FOREIGN PATENT DOCUMENTS

| CN | 101430627 | 5/2009 |
| EP | 2228710 | 9/2010 |
| TW | 201110004 | 3/2011 |

* cited by examiner

*Primary Examiner* — Bipin Shalwala
*Assistant Examiner* — Benyam Ketema
(74) *Attorney, Agent, or Firm* — WPAT, PC; Justin King

(57) ABSTRACT

An exemplary method for determining a touch point includes the following steps of: performing a first operation to determine whether a detected result of a first touch detection point exceeds a first threshold; performing a second operation to determine whether all detected results of multiple second touch detection points are no more than the detection result of the first touch detection point, the second touch detection points neighboring with the first touch detection point; performing a third operation to determine whether a sum of detected results of multiple third touch detection points exceeds a second threshold, the third touch detection points neighboring with the first touch detection point; and determining the first touch detection point as the touch point is being touched if the determine results of the first through third operations are all true.

8 Claims, 4 Drawing Sheets

| S1 | S2 | S3 |
|----|----|----|
| S4 | S5 | S6 |
| S7 | S8 | S9 |

FIG. 2

| 2 | 7 | 0 |
|---|---|---|
| 1 | 10 | 4 |
| 1 | 3 | 3 |

FIG. 3A

| 6 | 58 | 14 |
|---|----|----|
| 6 | 71 | 28 |
| 1 | 71 | 17 |

FIG. 3B

METHOD FOR DETERMINING TOUCH POINT

TECHNICAL FIELD

The disclosure generally relates to touch control fields, and more particularly to a method for determining a touch point.

BACKGROUND

With the development of science and technology, touch panels are widely used in various electronic products as a new human-machine interface owing to their advantages of more intuitive and more humane. Nowadays, the touch panels can be primarily classified into resistive type, capacitive type, surface acoustic type and optics type according to different sensing principles.

It is well-known that, due to its advantages of dustproof, wear-resistant and high resolution, the capacitive type touch panel has a wide application range including banking such as ATM and ticketing system, health care, public information and entertainment. However, the capacitive type touch panel has the drawback of wrong operation easily caused by an environmental factor such as static electricity or humidity, for example, when the user's finger 1 touches the capacitive type touch pane in a large area, noise interference would be easily occurred, resulting in the detection accuracy of the touch panel is challenged in some degree.

Therefore, how to suppress the noise effect during a touch point determining process to thereby improve the detection accuracy of touch panel has been an urgent problem needed to be solved.

SUMMARY OF DISCLOSURE

Accordingly, the disclosure is directed to a method for determining a touch point, so as to achieve high detection accuracy.

More specifically, a method for determining a touch point in accordance with an exemplary embodiment includes steps of: performing a first operation to determine whether a detected result of a first touch detection point exceeds a first threshold; performing a second operation to determine whether all detected results of multiple second touch detection points are not more than the detected result of the first touch detection point; performing a third operation to determine whether a sum of detected results of multiple third touch detection points exceeds a second threshold; and determining the first touch detection point as the touch point is being touched if the determine results of the first operation, the second operation and the third operation are all true. In the exemplary embodiment, the second touch detection points are neighboring with the first touch detection point, and the third touch detection points are also neighboring with the first touch detection point. Moreover, during performing the third operation, the detected result of the first touch detection point is accumulated to the sum and then the accumulated sum is determined whether exceeds the second threshold.

In one embodiment, the second touch detection points and the third touch detection points may be the same touch detection points. In addition, the above-described method may further includes a step of: selecting at least a part of even all of touch detection points neighboring with the first touch detection point as the second touch detection points.

The above-described exemplary embodiments are based on the characteristic of noise appearing individually rather than in groups and determine a certain touch detection point whether is the actual touch point touched by an object (e.g., finger(s)) according to the detected result of the certain touch detection point cooperative with the detected results of neighboring touch detection points. Accordingly, by use of the multiple determinant conditions, the noise effect can be suppressed and therefore high detection accuracy is achieved.

BRIEF DESCRIPTION OF THE DRAWINGS

The above objects and advantages of the present disclosure will become more readily apparent to those ordinarily skilled in the art after reviewing the following detailed description and accompanying drawings, in which:

FIG. 2 is a schematic positional distribution of multiple touch detection points in accordance with an exemplary embodiment;

FIG. 3A is an implementation of detected results of the touch detection points in FIG. 2; and FIG. 3B is another implementation of detected results of the touch detection points in FIG. 2.

DETAILED DESCRIPTION OF EMBODIMENTS

The present disclosure will now be described more specifically with reference to the following embodiments. It is to be noted that the following descriptions of embodiments are presented herein for purpose of illustration and description only. It is not intended to be exhaustive or to be limited to the precise form disclosed.

Figure 1A:
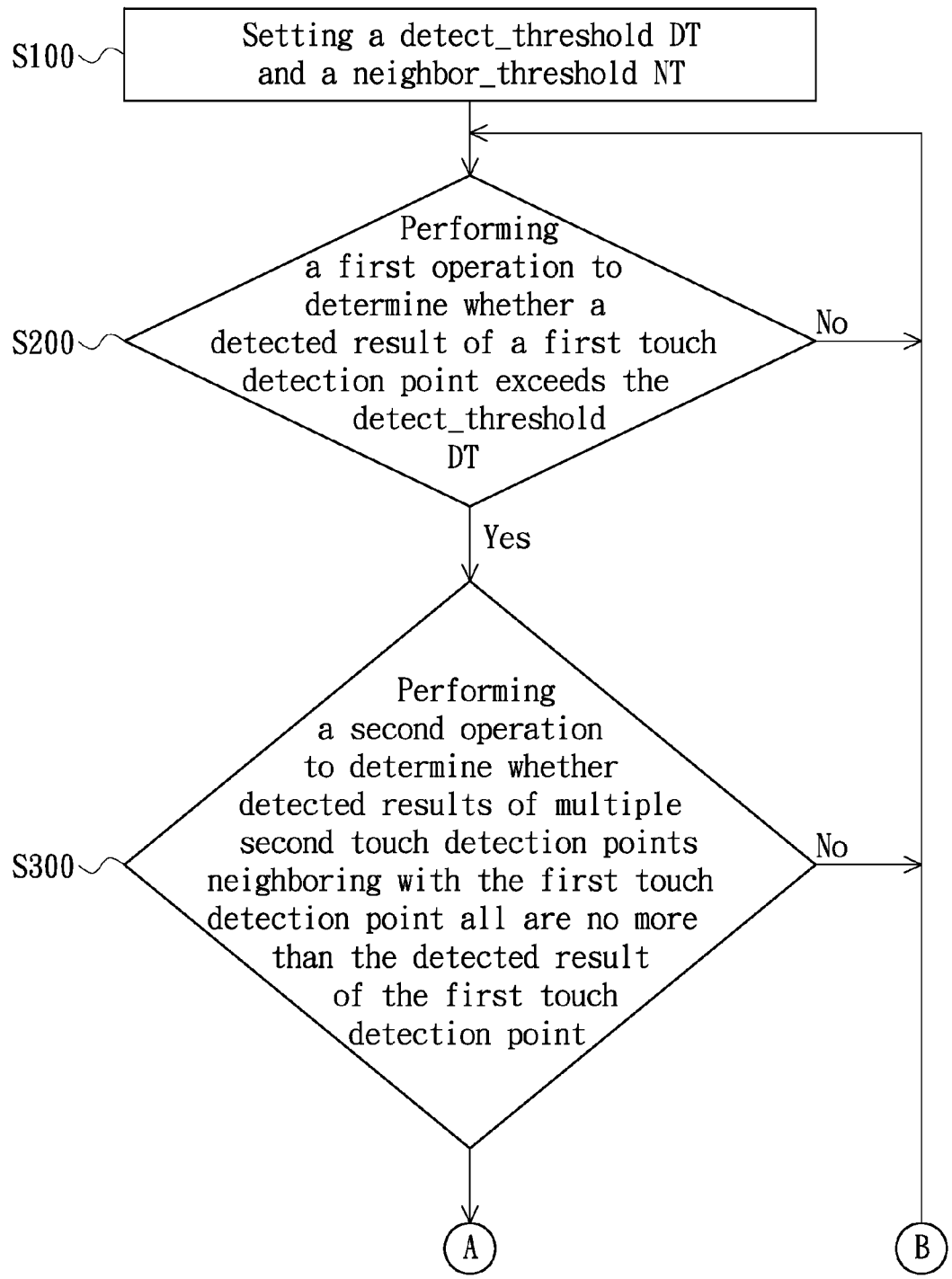
FIGS. 1A and 1B are a steps flowchart of a method for determining a touch point in accordance with an exemplary embodiment.
Figure 1B:
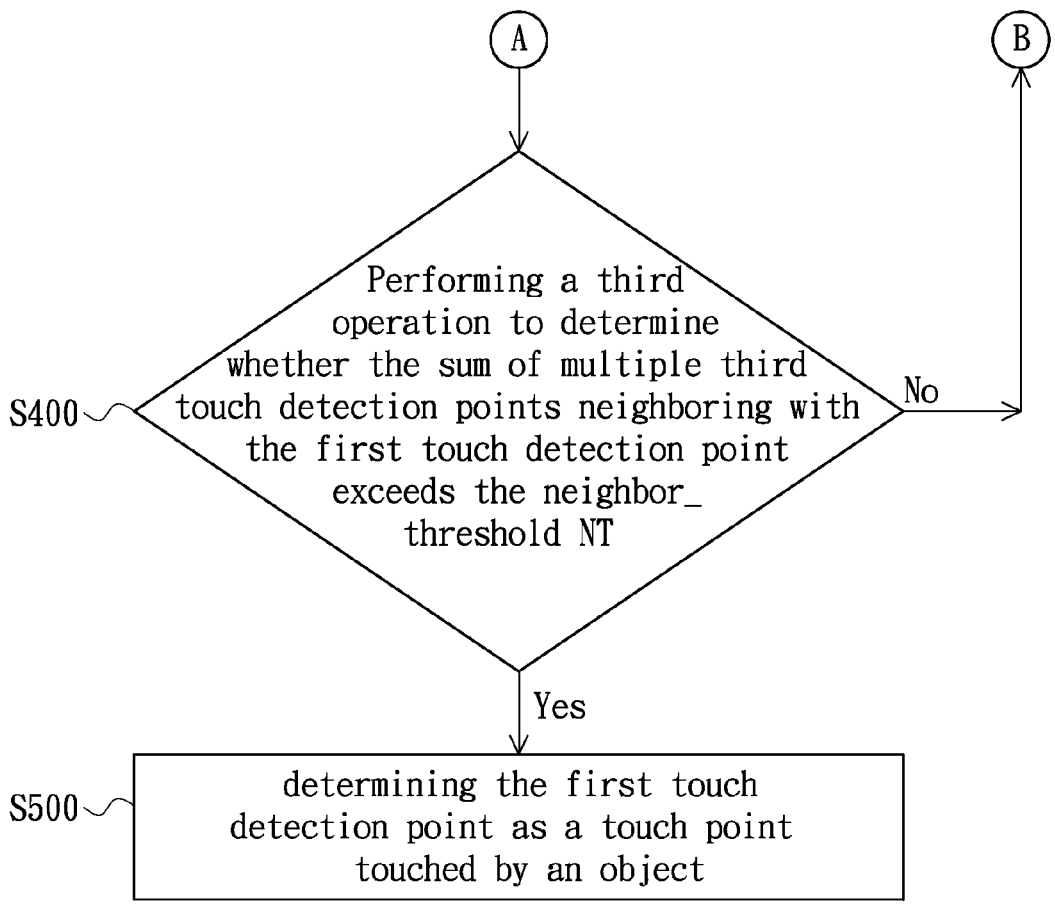

Referring to FIGS. 1A and 1B, FIGS. 1A and 1B are a steps flowchart of a method for determining a touch point in accordance with an exemplary embodiment. The method for determining a touch point in the exemplary embodiment may be applied to a capacitive type touch panel, but it is not to limit the present disclosure. As depicted in FIGS. 1A and 1B, the method for determining a touch point in the exemplary embodiment primarily includes the following steps S100~S500.

Specifically, in the step S100, a detect_threshold DT and a neighbor_threshold NT are set.

In the step S200, a first operation is performed to determine whether a detected result of a first touch detection point exceeds the detect_threshold DT. If the determine result of the first operation is FALSE, the first touch detection point is changed to be another one for performing the first operation again in the step S200. Whereas, if the determine result of the first operation is TRUE, the control goes to the next step S300.

In the step S300, a second operation is performed to determine whether detected results of multiple second touch detection points neighboring with the first touch detection point all are not more than the detected result of the first touch detection point. If the determine result of the second operation is FALSE, the control goes back to the step S200 and the first touch detection point is changed to be another one. Whereas, if the determine result of the second operation is TRUE, the control goes to the next step S400.

In the step S400, a third operation is performed to determine whether the sum of detected results of multiple third touch detection points neighboring with the first touch detection point exceeds the neighbor_threshold NT. If the determine result of the third operation is FALSE, the control goes back to the step S200 and the first touch point is changed to be another one. Whereas, if the determine result of the third operation is determined to be TRUE, the process goes to the next step S500.

In the step S500, the first touch detection point is determined as an actual touch point touched by an object (e.g., finger(s)).

In short, in the method for determining a touch point in accordance with the above exemplary embodiment, a current first touch detection point whether being determined as a touch point touched by an object is based on the determine results of the first through third operations whether all are TRUE. If the determine results all are TRUE, the current first touch detection point would be determined as an actual touch point, whereas, the first touch detection point is changed to be another one, i.e., the control goes to determine the next first touch detection point whether is an actual touch point.

Figure 2:
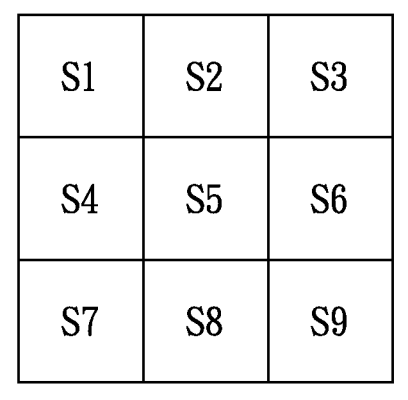
Figures 3A, 3B:
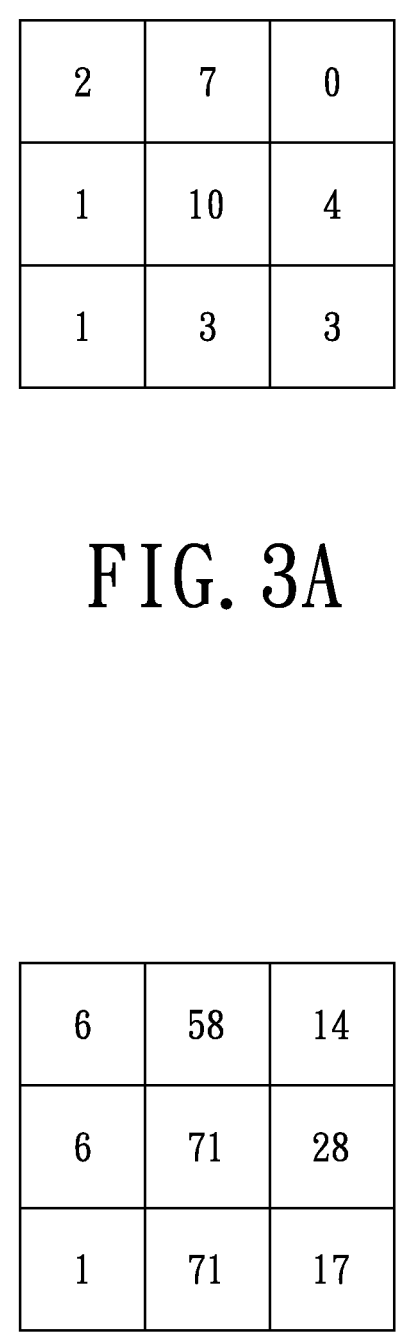

Referring to FIGS. 2 and 3A together, FIG. 2 is a schematic positional distribution of multiple touch detection points, and FIG. 3A is an implementation of detected results of the touch detection points in FIG. 2. As depicted in FIG. 2, S5 represents a first touch detection point; S1, S2, S3, S4, S6, S7, S8, S9 represent multiple second touch detection points; and S1, S2, S3, S4, S6, S7, S8, S9 also represent multiple third touch detection points. That is, the second touch detection points and the third touch detection points are the same touch detection points. In addition, as seen from FIG. 2, S1, S2, S3, S4, S6, S7, S8, S9 representative of multiple second touch detection points are neighboring with S5 representative of the first touch detection point. In the exemplary embodiment, the term of "neighboring" means two touch detection points have none of touch detection point arranged therebetween.

As depicted in FIG. 3A, the detected result of the first touch detection point S5 is "10", the detected results of the second and third touch detection points S1, S2, S3, S4, S6, S7, S8, S9 respectively are "2", "7", "0", "1", "4", "1", "3", "3". In the exemplary embodiment, the detect_threshold DT for example is 8 and the neighbor_threshold NT for example is 50. Since the detected result of the first touch detection point S5 exceeds the detect_threshold DT of 8, and the detected results of the second touch detection points S1, S2, S3, S4, S6, S7, S8, S9 all are not more than the detected result "10" of the first touch detection point S5, but the sum of the detected results of the third touch detection points S1, S2, S3, S4, S6, S7, S8, S9 is (2+7+0+1+4+1+3+3)=21, which is smaller than the neighbor_threshold NT of 50. Accordingly, the first touch detection point S5 would be determined as a noise point rather than an actual touch point.

In addition, during calculating the sum of the detected results of the third touch detection points S1, S2, S3, S4, S6, S7, S8, S9, the detected result "10" of the first touch detection point S5 can be accumulated to the sum and then the accumulated sum is determined whether exceeds the neighbor_threshold NT. Herein, the accumulated sum is (21+10)=31, which still is smaller than the neighbor_threshold NT of 50. As a result, the first touch detection point S5 would still be determined to be not an actual touch point.

Referring to FIGS. 2 and 3B together, FIG. 3B is another implementation of detected results of the touch detection points in FIG. 2. As depicted in FIG. 3B, the detected result of the first touch detection point S5 is "71", the detected results of the second and third touch detection points S1, S2, S3, S4, S6, S7, S8, S9 respectively are "6", "58", "14", "6", "28", "1", "71", "17". In order to conveniently compare with the two implementations, S5 with the detected result in FIG. 3B and S5 with the detected result in FIG. 3A are representative of different first touch detection points arranged in a same column. In addition, the detect_threshold DT for example is 8 and the neighbor_threshold NT for example is 50. Since the detected result of the first touch detection point S5 exceeds the detect_threshold DT of 8, and the detected results of the second touch detection points S1, S2, S3, S4, S6, S7, S8, S9 all are not more than the detected result "71" of the first touch detection point S5, and the sum of the detected results of the third touch detection points S1, S2, S3, S4, S6, S7, S8, S9 is (6+58+14+6+28+1+71+17)=201, which exceeds the neighbor_threshold NT of 50. Accordingly, the first touch detection point S5 would be determined as an actual touch point. Likewise, during calculating the sum of the detected results of the third touch detection points S1, S2, S3, S4, S6, S7, S8, S9, the detected result "71" of the first touch detection point S5 may be accumulated to the sum and then the accumulated sum is determined whether exceeds the neighbor_threshold NT. Herein, the accumulated sum is (201+71)=272 and still exceeds the neighbor_threshold NT, and therefore the first touch detection point S5 is determined as an actual touch point.

Moreover, it is noted that, in the foregoing exemplary embodiments, the neighboring touch detection points S1, S2, S3, S4, S6, S7, S8, S9 of the first touch detection point S5 all are used as the second touch detection points as well as the third touch detection points, but the present disclosure is not limited to this example, for example, only the group of S2, S4, S6, S8 or the group of S1, S3, S5, S8 are used as the second touch detection points as well as the third touch detection points instead, or the second touch detection points are different from the third touch detection points.

Sum up, the above-described various embodiments use the detected result of a certain touch detection point cooperative with the detected results of multiple neighboring touch detection points to determine whether the certain touch detection point is an actual touch point touched by the object (e.g., finger(s)). By use of setting multiple determinant conditions, the noise effect can be suppressed and therefore high detection accuracy can be achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for determining a touch point, comprising the steps of:
   performing a first operation to determine whether a detected result of a first touch detection point exceeds a first threshold;
   performing a second operation to determine whether all detected results of a plurality of second touch detection points are not more than the detected result of the first touch detection point, the second touch detection points neighboring with the first touch detection point;
   performing a third operation to determine whether a sum of detected results of a plurality of third touch detection points exceeds a second threshold, the third touch detection points neighboring with the first touch detection point; and
   determining the first touch detection point as the touch point is being touched if the determine results of the first through third operations are all true.

2. The method as claimed in claim 1, the step of performing the third operation further comprising accumulating the detected result of the first touch detection point to the sum and determining whether the accumulated sum exceeds the second threshold.

3. The method as claimed in claim 1, wherein the second touch detection points and the third touch detection points are the same.

4. The method as claimed in claim 3, the step of performing the third operation further comprising accumulating the detected result of the first touch detection point to the sum and determining whether the accumulated sum exceeds the second threshold.

5. The method as claimed in claim 3, further comprising:
selecting at least a part of touch detection points neighboring with the first touch detection point as the second touch detection points.

6. The method as claimed in claim 5, the step of performing the third operation further comprising accumulating the detected result of the first touch detection point to the sum and determining whether the accumulated sum exceeds the second threshold.

7. The method as claimed in claim 3, further comprising:
selecting all of touch detection points neighboring with the first touch detection point as the second touch detection points.

8. The method as claimed in claim 7, the step of performing the third operation further comprising accumulating the detected result of the first touch detection point to the sum and determining whether the accumulated sum exceeds the second threshold.

* * * * *